United States Patent
Saho et al.

[11] Patent Number: 5,944,986
[45] Date of Patent: Aug. 31, 1999

[54] LIQUID PURIFICATION APPARATUS

[75] Inventors: Norihide Saho, Tsuchiura; Hisashi Isogami; Minoru Morita, both of Niihari-gun; Koichi Tsuzuki, Tsuchiura; Hiroaki Okajima, Kamagaya, all of Japan

[73] Assignee: Hitachi, Ltd., Japan

[21] Appl. No.: 08/715,324

[22] Filed: Sep. 18, 1996

[30] Foreign Application Priority Data

Sep. 19, 1995 [JP] Japan ................................ 7-239582
Oct. 20, 1995 [JP] Japan ................................ 7-272299

[51] Int. Cl.$^6$ ............................................. B01D 35/06
[52] U.S. Cl. ..................... 210/173; 210/182; 210/223; 210/259; 209/3; 209/213; 435/290.1
[58] Field of Search ..................... 210/182, 202, 210/222, 223, 241, 253, 259, 411, 695, 768–771, 670, 691, 173; 71/16, 23; 209/40, 2, 213; 435/290.1; 494/36

[56] References Cited

U.S. PATENT DOCUMENTS

| | | | |
|---|---|---|---|
| 3,630,365 | 12/1971 | Woodbridge et al. | 210/241 |
| 3,638,590 | 2/1972 | Roberts et al. | 210/768 |
| 3,803,033 | 4/1974 | Sutherland | 210/695 |
| 4,124,503 | 11/1978 | Watson | 210/695 |
| 4,193,866 | 3/1980 | Slusarczuk et al. | 210/695 |
| 4,781,298 | 11/1988 | Hemstock et al. | 210/695 |

FOREIGN PATENT DOCUMENTS

| | | | |
|---|---|---|---|
| 4031978 | 4/1991 | Germany | 210/241 |
| 55-61979 | 5/1980 | Japan . | |
| 55-132684 | 10/1980 | Japan . | |
| 59-371 | 1/1984 | Japan | 210/695 |
| 60-244390 | 12/1985 | Japan . | |
| 1637833 | 3/1991 | U.S.S.R. | 210/223 |

OTHER PUBLICATIONS

Harland et al, High Gradient Magnetic Filtration, Chemical Engineering Progress, pp. 80–81, Oct. 1976.

*Primary Examiner*—Matthew O. Savage
*Attorney, Agent, or Firm*—Evenson, McKeown, Edwards & Lenahan, P.L.L.C.

[57] ABSTRACT

A magnetic separation apparatus which coagulates substances to be removed in liquid by adding magnetic substances and a flocculent to liquid to be treated and adsorbs and captures the thus obtained magnetic aggregates by utilizing magnetic field of magnetic substances which move relative to the liquid to be treated, and other magnetic separation apparatus comprising a magnetic filter which contains charging magnetic metallic elements placed in a magnetic field and which magnetically adsorbs and captures the magnetic aggregates, are appropriately combined to remove the magnetic aggregates from the liquid to be treated with good efficiency. Substances to be removed in liquid can be removed with further good efficiency by employing a method of separating the magnetic aggregates separated by the magnetic filter from liquid with a centrifugal separator.

5 Claims, 10 Drawing Sheets 5,944,986

LIQUID PURIFICATION APPARATUS

BACKGROUND OF THE INVENTION

The present invention relates to a magnetic separation apparatus. More particularly, the present invention is directed to a magnetic separation apparatus which can remove undesirable substances from a liquid to be treated, in which suspended solids, suspended organisms such as algae and fungi, and the like are contained, to thereby purify the liquid at a high rate, and also to a liquid purification apparatus using the magnetic separation apparatus.

Many of closed water areas such as lakes and rivers, reservoirs, and the like are advanced to be nutritious by inflow of domestic effluent or the like in associate with urbanization. As a result, multiplication of phytoplanktons has taken place to pollute the closed water areas. Occasionally, the problem arises that Mycrocystis (a state that phytoplanktons such as bluegreen algae (Cyanophyceae) excessively multiply, thereby forming a bluish green layer on a water surface) generate. In particular, in the event that a large amount of Mycrocystis generate in summer season, it is strongly demanded to develop a technology which can remove those at high rate with energy savings.

Conventionally, as a water purification apparatus for purifying raw water such as rivers or reservoirs, waste water, and the like by utilizing such a solid/liquid separation art, a magnetic separation apparatus having a two-stages magnetic separation step utilizing a magnetic attraction is proposed in JP-A-55-132684, and also a dewatering concentration method after separation is proposed in JP-A-55-61979.

The apparatus described in JP-A-55-132684 performs a magnetic treatment method comprising previously adding and dispersing ferromagnetic seeds into waste water in which most of materials to be treated are non-magnetic and diamagnetic materials, coagulating the materials to be treated and the magnetic seeds in the waste water by the action of a flocculent or the like, magnetically filtering off magnetic aggregates formed of the materials to be treated and the magnetic seeds, and separating the materials to be treated from the waste water. Here, the magnetic filtration method comprises magnetically sedimenting magnetic aggregates having a relatively large size in the first stage, and magnetically filtering magnetic aggregates having a relatively small grain diameter which have not been sedimented in the first stage within a predetermined retention time, in the second stage to obtain a treated water.

This method is a high gradient magnetic filter separation system in which a ferromagnetic filtration medium such as a ferromagnetic stainless wool in the magnetic filtration apparatus of the second stage is excited by an exciting medium such as an electromagnet or a permanent magnet from the outside, purification operation is temporarily stopped after accumulating a certain degree of magnetic aggregates on the ferro-magnetic filtration medium, reverse washing operation is conducted such that the magnetic aggregates accumulated on the ferromagnetic filtration medium are washed and separated using treating water, and the reverse washing water containing the magnetic aggregates is temporarily stored in a rinsing tank. This reverse washing water contains much treating water. Therefore, a step of again concentrating the magnetic aggregates from the reverse washing water is necessary, but its treatment method is not described at all. Further, there is no description regarding a high rate treatment method of the magnetic aggregates sedimented in the first stage. Thus, it is not clear how method should be performed to conduct a high rate purification operation as a whole apparatus.

On the other hand, JP-A-55-61979 discloses a high rate treatment method of a washing water containing magnetic aggregates after reverse washing in the high gradient magnetic separation method. This is, for example, a method using a rotating magnetic separation apparatus comprising disposing a rotating disc having permanent magnets disposed on the circumference of the disc, in a rinsing tank, and directly separating the magnetic aggregates from the washing water on the surface of the permanent magnets. However, this prior art involves the disadvantages that since all the magnetic aggregates are captured and stored in the high gradient magnetic separator, a separation portion is clogged with the magnetic aggregates within a short period of time, resulting in shortening a reverse washing operation period, and the purification operation is disturbed from a high rate operation. Further, since all the magnetic aggregates in raw water are contained in the washing water for reverse washing, a large amount of the magnetic aggregates must be separated through the rotating magnetic separation apparatus, making it difficult to conduct reverse washing water purification at a high rate.

However, with increasing a volume of a purification treatment amount of water treatment apparatus, a high current velocity of a treating water in a magnetic separation portion, continuous purification and concentration operations of reverse washing water become necessary. As mentioned above, the magnetic separation apparatus which captures and removes the magnetic aggregates by two stages depending on their sizes is advantageous for a high rate operation. However, the magnetic separator in the first stage must continuously remove the separated large-sized magnetic aggregates from a duct.

Further, in order to attempt a high rate operation as a purification apparatus including the operation up to concentration of reverse washing water, separation of the magnetic aggregates from reverse washing water must be conducted at a high rate.

Further, JP-A-60-244390 describes a technology in which magnetic particulates are mixed with raw water containing red tide in order to recover red tide or Mycrocystis present in hydrosphere, those are captured with a first magnetic filter, particulate substances captured (red tide planktons and ferromagnetic particulates are intermingled with each other) are recovered by washing the first magnetic filter, the particulates in which red tide planktons and ferro-magnetic particulates are intermingled are separated into the red tide planktons and the ferromagnetic particulates by a second magnetic filter, and the separated red tide planktons (red tide slurry) are dewatered and concentrated with a centrifugal separator.

In this method, after separating into the red tide planktons and ferromagnetic particulates, the red tide planktons (red tide slurry) are dewatered and concentrated with a centrifugal separator. In view of the fact that red tide planktons and Mycrocystis generated in lakes and rivers float on a water surface, their density is about 1 which is substantially the same as the density of water. Therefore, even if those are treated with a centrifugal separator, it is difficult to separate water and the red tide slurry on the theory of a centrifugal separator.

JP-A-55-61979 describes a technology in which magnetite and a flocculent are added to raw water as materials for separating solid substances and water contained in sewage and waste water, not red tide and Mycrocystis, those are separated into water and aggregates by magnetic separation, magnetite is further added to the solid substances to re-coagulate those, the re-coagulated sludge is adsorbed on magnets disposed on a rotating plate, the adsorbed sludge is scraped with a scraper, and the scraped sludge is placed in a heating furnace to heat the same therein, thereby separating into solid substances and magnetite.

This method involves the problem that since magnetite is further added to the aggregates obtained by the magnetic separation, and every aggregate containing magnetite is introduced into a heating furnace to dewater the aggregate and separate magnetite as a solid substance, magnetite in an amount more than the necessary amount is required to use, and a heating furnace for separating the solid substances and magnetite is required.

SUMMARY OF THE INVENTION

In view of above, an object of the present invention is to provide a magnetic separation apparatus which can increase an amount of purification treatment by enhancing a current velocity of a treating liquid including water in a magnetic separation section and shortening a purification treatment stopping time for reverse washing.

Another object of the present invention is to separate solid substances and magnetite by dewatering aggregates without re-adding magnetic substances, in view of the problems involved in the art disclosed in JP-A-55-61979.

To achieve the above-mentioned objects of the present invention, there is provided a liquid purification apparatus comprising:

- a first magnetic separation section which adsorbs and captures magnetic aggregates containing substances to be removed formed by adding magnetic substances and a flocculent to liquid to be treated, by utilizing a magnetic field of the magnetic substances which act relative to the liquid to be treated;
- a second magnetic separation section including a magnetic filter which contains charging magnetic metallic elements, for example metallic fibers, and magnetically adsorbs and captures the magnetic aggregates and which is placed in a magnetic field; and
- a concentration means for decreasing liquid in the magnetic aggregates adsorbed on the magnetic filter,
- wherein the first magnetic separation section, the second separation section, and the concentration means are successively disposed in this order from an upstream side of a flow of liquid to be treated in purification operation,
- wherein the concentration means is a means for centrifuging the magnetic substances separated by the magnetic filter, and
- wherein the apparatus further contains a means for removing the magnetic substances from the magnetic aggregates after centrifugal separation.

The combination of the first and the second separation sections provides the following advantages.

Size of the magnetic aggregates formed at a pre-treatment to the magnetic separation step and content of a magnetic powder are not constant, and the magnetic powder content and an attractive force to a magnetic surface are large as the size of the aggregates increases. Such aggregates having a large size are adsorbed and captured on the magnet surface of the first magnetic separation section even in a flow having a large current velocity, and continuously removed into flow passages by a removal means. Small-sized aggregates having a small magnetic powder content are not adsorbed and captured on the magnetic surface of the first magnetic separation section, flown into the second magnetic separation section disposed at a downstream side of the first magnetic separation section, and captured by a magnetic filter of metallic elements therein. Almost all of those magnetic aggregates are large-sized aggregates, and the amount of the magnetic aggregates accumulated on the magnetic filter can be reduced one-half or less and a reverse washing period can be prolonged two times or more, compared with those in an apparatus where the first magnetic separation section is not used. As a result, the reverse washing period can be prolonged, that is, a purification operation stopping time for reverse washing can be shortened, thereby the purification treatment amount can be increased. Further, the amount of the magnetic aggregates accumulated on the magnetic filter reduces in an amount corresponding to the large-sized magnetic aggregates removed, compared with the total amount of the magnetic aggregates in raw liquid, and hence separation of the magnetic aggregates from washing liquid can be conducted at a high rate.

The magnetic aggregates captured by the magnetic filter are removed by reverse washing of the magnetic filter. Washing liquid after reverse washing is stored in a back washing treatment liquid tank. This stored liquid is treated with a centrifugal separator, thereby separating the magnetic aggregates having a large specific gravity containing magnetic powder and liquid.

According to a second aspect of the present invention, there is provided a magnetic separation apparatus comprising:

- a first magnetic separation section which adsorbs and captures the magnetic aggregates contained in liquid to be treated by utilizing a magnetic field of first magnetic substances which move relative to liquid to be treated in the liquid; and
- a second magnetic separation section which adsorbs and captures magnetic aggregates contained in liquid to be treated by a magnetic filter of magnetic metallic elements in a magnetic field of a second magnet for generating magnetic field,
- wherein the first magnetic separation section is disposed at an upstream side of the second magnetic separation section in the direction of flow of the liquid to be treated at purification operation, and
- wherein the apparatus further comprises a removal means for continuously removing the magnetic aggregates adsorbed and captured in the first magnetic separation section.

In the above apparatus according to the second aspect of the invention, a third magnetic separation section which continuously adsorbs and captures the magnetic aggregates in the reverse washing water by utilizing a magnetic field of third magnetic substances which move relative to the reverse washing liquid in the reverse washing water may be disposed at an downstream side of the second magnetic separation section in the direction of flow of the reverse washing liquid at the reverse washing operation of the high gradient magnetic filter in the second magnetic separation section, and the third magnetic separation section may be provided with a removal means for continuously removing the magnetic aggregates adsorbed and captured in the third magnetic separation section.

In addition, in the above apparatus according to the second aspect of the invention, pipings may be arranged which lead the reverse washing liquid passed through the magnetic filter to the first magnetic separation section at the reverse washing operation of the magnetic filter in the second magnetic separation section, and pipings may also be arranged which remove the reverse washing liquid passed through the first magnetic separation section from the first magnetic separation section.

The above apparatus according to the second aspect of the present invention provides the following advantages.

Size of the magnetic aggregates formed at a pre-treatment to the magnetic separation step and content of a magnetic powder are not constant, and the magnetic powder content and an attractive force to a magnetic surface are large as the size of the aggregates increases. Such aggregates having a large size are adsorbed and captured on the magnet surface of the first magnetic separation section even in a flow having a large current velocity, and continuously removed into flow passages by a removal means. Small-sized aggregates having a small magnetic powder content are not adsorbed and captured on the magnetic surface of the first magnetic separation section, flown into the second magnetic separation section disposed at a downstream side of the first magnetic separation section, and captured by a magnetic filter of metallic elements therein. Almost all of those magnetic aggregates are large-sized aggregates, and the amount of the magnetic aggregates accumulated on the magnetic filter can be reduced one-half or less and a reverse washing period can be prolonged two times or more, compared with those in a apparatus where the first magnetic separation section is not used. As a result, the reverse washing period can be prolonged, that is, a purification operation stopping time for reverse washing can be shortened, thereby the amount of purification treatment can be increased. Further, the amount of the magnetic aggregates accumulated on the high gradient magnetic filter is reduced in an amount corresponding to the large-sized magnetic aggregates removed, compared with the total amount of the magnetic aggregates in raw liquid, and hence separation of the magnetic aggregates from washing liquid can be conducted at high rate.

If the third magnetic separation section which conducts magnetic separation of magnetic aggregates from washing liquid is disposed, reverse washing liquid in the second magnetic separation section is once stored in the third magnetic separation section, and immediately after completion of reverse washing, purification operation can be re-conducted using the second and first magnetic separation sections. Further, by conducting magnetic separation of the magnetic aggregates in the washing liquid temporarily stored, in parallel to the purification operation, purification operation stopping time for reverse washing can be shortened.

According to a third aspect of the present invention, there is provided a purification apparatus comprising:

a magnetic filter which magnetically adsorbs magnetic aggregates containing substances to be removed formed by adding magnetic substances and a flocculant to raw water to be purified; and a concentration means for decreasing liquid in the magnetic aggregates adsorbed on the magnetic filter, wherein the concentration means is a means for centrifuging the magnetic aggregates separated by the magnetic filter, and wherein the apparatus further comprises a means for removing the magnetic substances from the magnetic aggregates after the centrifugal separation.

PREFERRED EMBODIMENTS OF THE INVENTION

Figure 1:
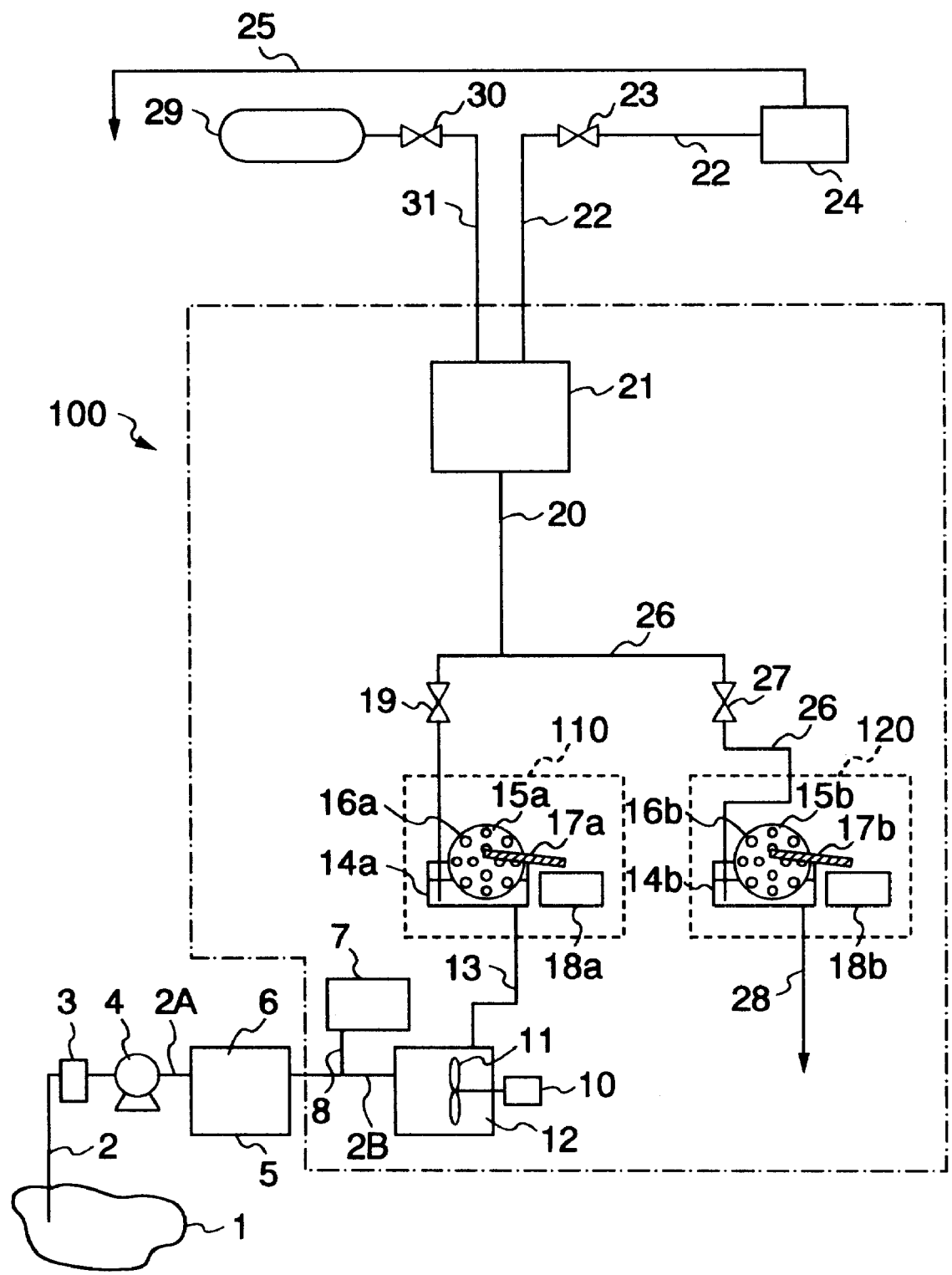
FIG. 1 is a systematic view showing a main configuration of a magnetic separation apparatus according to a first embodiment of the present invention.

The first embodiment of the present invention is described by referring to FIG. 1 below. The water purification apparatus shown in FIG. 1 comprises a conduit tube 2 equipped with a filter 3, in which one open end thereof is arranged under water surface of an impounding reservoir 1, a pump 4 connecting its suction side to the other end of the conduit tube 2, a raw water storage tank 5 connected to a discharge side of the pump 4 with a conduit tube 2A, a magnetic separation apparatus 100 connected to the raw water storage tank 5 with a conduit tube 2B, a treating water tank 24 connected to the magnetic separation apparatus 100 with a conduit tube 22 having a valve 23, a conduit tube 25, one end thereof being connected to the treated water tank 24 and another end thereof being derived into the impounding reservoir 1, and an air tank 29 connected to the magnetic separation apparatus 100 with an air pipe 31 having a valve 30. Regarding a pump for flowing water, difference between water heads, and the like, the description and explanation thereof are omitted.

The magnetic separation apparatus 100 comprises a stirring tank 12 having a stirrer 11 driven by a motor 10, connected to the raw water storage tank 5 with a conduit tube 2B, a chemical preparation apparatus 7 connected to the conduit tube 2B with a conductor 8, a first magnetic separation section 110 connected to the stirring tank 9 with a conduit tube 13, a second magnetic separation section 2I connected to an outlet side of water to be treated of the first magnetic separation section 110 with a conduit tube 20 having a valve 19, and a third magnetic separation section 120 connected to a conduit tube 20 between the valve 19 and the second magnetic separation section 21 with a washing liquid outlet piping 26 having a valve 27. The conduit tube 22 and the air pipe 31 are connected to a treated water outlet side of the first magnetic separation section 21.

The second magnetic separation section 21 is formed including a magnet for generating magnetic field, and a magnetic filter having charging magnetic metallic elements such as metallic fibers, disposed in the magnetic field, and are constituted such that water to be treated flows passing through the high gradient magnetic filter. It is possible in the second magnetic separation section 21 to conduct reverse washing treatment of the magnetic filter.

The first magnetic separation section 110 comprises a rotating disc 15A having a rotation axis supported substantially horizontally and having a number of permanent magnet discs 16A embedded in the surface thereof, a rotating type magnetic separation tank 14A having the rotating disc 15A and through which water to be treated flows, a spatula 17A which scrapes off adsorbed materials (magnetic aggregates) on the surface of the rotating disc 15A, and a sludge tank 18A disposed at a position where materials scraped off by the spatula 17A fall down. The conduit tubes 13 and 20 are connected to the rotating type magnetic separation tank 14A. The rotating disc 15A is disposed such that the lower-half portion is in water of the rotating type magnetic separation tank 14A, and the rotation axis thereof projects beyond the water surface. The spatula 17A is disposed at a position of scraping off the magnetic aggregates adsorbed on the rotating disc 15A on the waster surface. The rotating disc 15A is continuously rotated in a predetermined direction with a driving means which is not shown.

The third magnetic separation section 120 comprises a rotating disc 15B having a rotation axis supported substantially horizontally and having a number of permanent magnet discs 16B embedded in the surface thereof, a reverse washing water tank 14B having the rotating disc 15B therein, and in which reverse washing water is temporarily stored, a spatula 17B which scrapes off materials adsorbed on the surface of the rotating disc 15B, and a sludge tank 18B disposed at a position where materials scraped off with the spatula 17B fall down, and a conduit tube 28 connected to the reverse washing water tank 14B. The conduit tube 26 is connected to the reverse washing water tank 14B. The rotating disc 15B is disposed such that the lower half portion thereof is in water of the reverse washing water tank 14B, and the rotation axis projects beyond the water surface. The spatula 17B is disposed at a position of scraping off the magnetic aggregates adsorbed on the rotating disc 15B on the water surface. The rotating disc 15B is continuously rotated in a predetermined direction with a rotatory driving means which is not shown.

Operations of the above apparatus are now described. The magnetic aggregates are specifically obtained by the following method. Water to be treated which is treated with water is stirred by adding thereto magnetic powder of, for example, triiron tetraoxide, and aluminum sulfate or aluminum chloride as a flocculent, as a pre-treatment to a magnetic separation step. Suspended solids, algae, fungi, and microorganisms in raw water are bonded to the magnetic powder by the flocculent, forming colloidal magnetic aggregates having magnetism.

Raw water to be treated, in the impounding reservoir 1 is drawn by suction with a pump 4 through a conduit tube 2, and is once stored in a raw water storage tank 5 through a filter 3 for removing large-sized dusts. Magnetic powder of triiron tetraoxide and a flocculent such as polyaluminum chloride are added to the raw water 6 through a conduit tube 8. The resulting mixture is stirred with a stirrer 11 in a stirring tank 9 to form a pre-treatment water 12 containing magnetic aggregates. The pre-treatment water 12 is flown into a rotating type magnetic separation tank 14A through a conduit tube 13. In the rotating type magnetic separation tank 14A, the rotating disc 15A continuously rotated, with the lower half portion thereof being in water. A number of magnetic substances such as permanent magnet disc 16A are embedded in the surface of the rotating disc 15A, and magnetic aggregates containing a large amount of magnetic powder in the pre-treatment water 12, mainly large-sized magnetic aggregates, are adsorbed and captured on the surface of the permanent magnet disc 16A. The magnetic aggregates captured move onto a liquid surface along rotation of the rotating disc 15A which rotates, are scraped off from a magnet surface with the spatula 17A before again sinking in water, and are stored in the sludge tank 18A. The pre-treatment water 12 inflows from one end of the rotating type magnetic separation tank 14A, and outflows from another end thereof to the conduit tube 20. Flow direction in the rotating type magnetic separation tank 14A is reverse to the rotation of the rotating disc 15A, so that the permanent magnet discs 16A of the rotating disc 15A move relative to water to be treated.

The pre-treatment water 12 from which large-sized magnetic aggregates have been removed passes through the conduit tube 20 via the valve 19, and flow in the high gradient magnetic filter of the second magnetic separation section 21, whereby the remaining magnetic aggregates are captured by the high gradient magnetic filter. Purified raw water from which the magnetic aggregates have been removed is once stored as a treated water in the treated water tank 24 through the conduit tube 22 and the valve 23, and is returned to the impounding reservoir 1 through the conduit tube 25 acting as a water-sending means.

The high gradient magnetic filter of the second magnetic separation section 21 reduces its magnetic separation performance as the magnetic aggregates adsorb. Therefore, after the magnetic aggregates are captured by the high gradient magnetic filter in a certain amount (or after conducting purification operation for a certain time, or if differential pressure between pressures before and after the high gradient magnetic filter exceeds a predetermined value), in order to restore the performance of magnetic separation of the high gradient magnetic filter, reverse washing is conducted to wash the filter. The magnetic separation section at the right side shows the reverse washing course. Reverse washing is conducted as follows. The valve 19 is closed, the valve 27 is opened, and the magnet for generating magnetic field is demagnetized. The treated water in the treated water tank 24 is back flown to the high gradient magnetic filter in a predetermined amount as washing water through the valve 23, the magnetic aggregates captured by the high gradient magnetic filter is flown out together with the washing water through the washing liquid outlet piping 26, and the washing water (which may be called reverse washing water) is stored in the reverse washing water tank 14B. In this washing, air is supplied from the air tank 29 to the second magnetic separation section through the valve 30 and the air pipe 31 to conduct air bubbling, whereby the magnetic aggregates are removed from the filter efficiently.

In the rotating disc 15B placed in the reverse washing water tank 14B, a number of magnetic substances such as permanent magnet discs 16B are embedded, and the magnetic aggregates containing magnetic powder in the washing water, mainly small-sized magnetic aggregates, are captured on the surface of the permanent magnet discs 16B. The magnetic aggregates captured on the surface of the permanent magnet discs 16B move on a liquid surface along the rotation of the rotating disc 15B, are scraped off from a magnet surface with the spatula 17B, and are then stored in the sludge tank 18B. The washing water from which the magnetic aggregates have been removed is returned to a water source through a conduit 28, or used as a washing water. In the magnetic separation in the first magnetic separation section 110, the pre-treatment water 12 flows in a constant direction in the rotating type magnetic separation tank 14A, but in the magnetic separation in the third magnetic separation section 120, the washing water is stored in the reverse washing water tank 14B, and is stationary without flowing.

The magnetic aggregates in the sludge tanks 18A, 18B are carried from the respective tank, and after dewatering treatment, magnetic powder is recovered therefrom, or those are discarded to a fill-in land or the like, or are incinerated.

After reverse washing, the valves 27 and 30 are closed, the valve 19 is opened to fill pre-treatment water in the magnetic separation section 21, and purification operation is re-opened. Simultaneously, the magnetic separation of washing water stored in the reverse washing water tank 14B is performed in parallel to the purification operation using the second and first magnetic separation sections.

Thus, according to this embodiment, the most part of the magnetic aggregates in the pre-treatment water 12 are large-sized magnetic aggregates, and almost all of them are continuously captured in the first magnetic separation section of the magnet rotating method and are continuously removed. Therefore, the amount of the magnetic aggregates accumulated on the high gradient magnetic filter can be reduced to one-half or less, and the reverse washing period can be prolonged two times or more. Thus, in this embodiment, the reverse washing period can be prolonged as long as possible, and the magnetic separation of the magnetic aggregates from the washing water at reverse washing and the purification operation can be conducted in parallel. Therefore, the purification amount can be increased. Further, the magnetic aggregates contained in the reverse washing water are that the respective magnetic aggregates are bonded to form large-sized aggregates. As a result, the efficiency of the magnetic separation by the rotating disc 15B is increased and it is possible to conduct the separation step at high rate.

Figure 2:
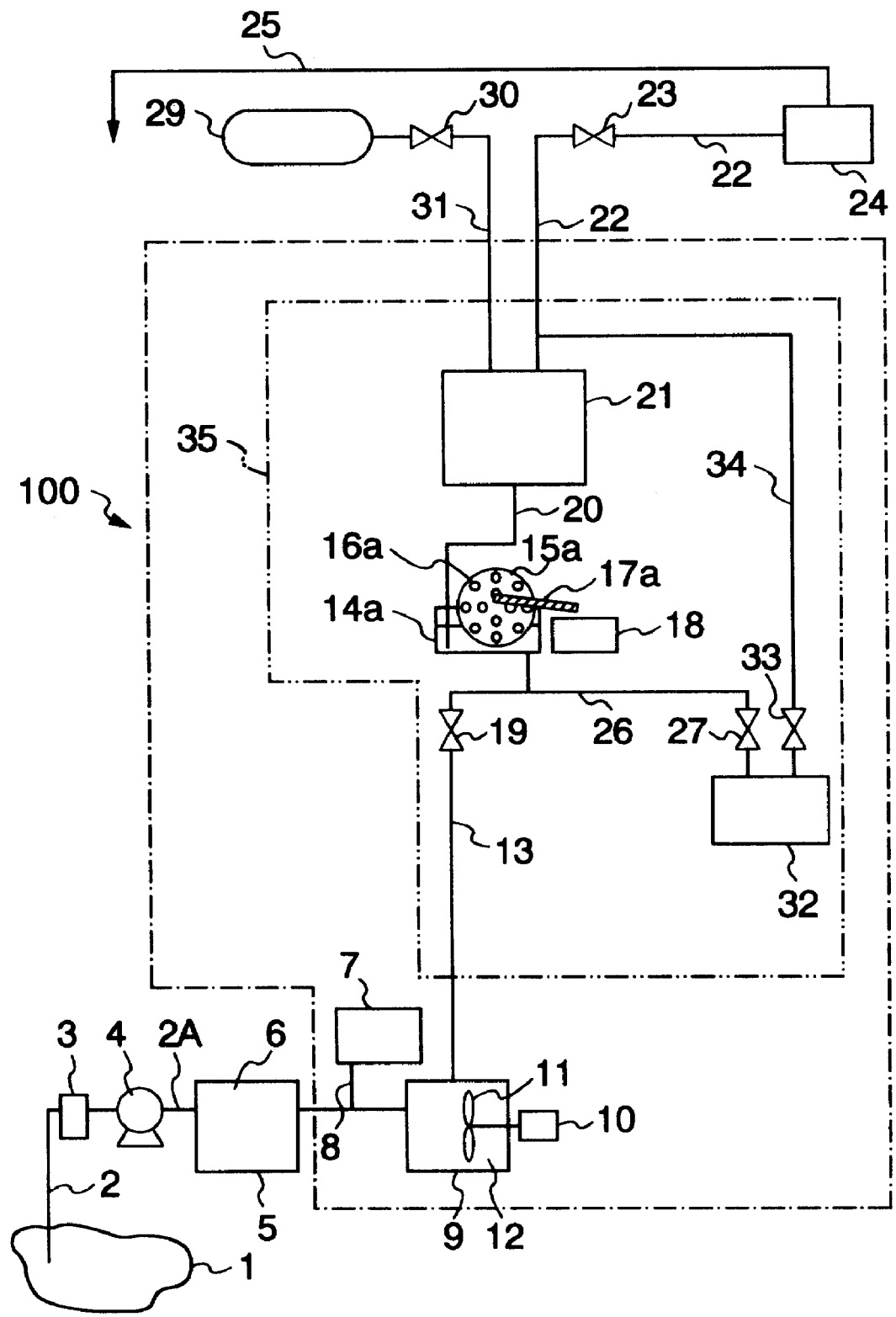
FIG. 2 is a systematic view showing a main configuration of a magnetic separation apparatus according to a second embodiment of the present invention.

The second embodiment according to the present invention is shown in FIG. 2. The points that this second embodiment differs from the embodiment shown in FIG. 1 are that the first magnetic separation section 110 containing the rotating type magnetic separation tank 14 is disposed at a downstream side of the valve 19 when the purification operation, and at an upstream side of the valve 27 when reverse washing, thereby the first magnetic separation section 110 also brings about the function of the third magnetic separation section 120 in the first embodiment. Further, in this embodiment, the treated water tank 32 is placed at an downstream side of the valve 27 in place of the third magnetic separation section 120, and the treated water tank 32 is connected to the conduit tube 22 at the outlet side of the second magnetic separation section 21 from the conduit tube 34 having the valve 33.

According to this embodiment, a number of rotating type magnetic separation tank can be reduced, and a size of the apparatus can be decreased. In addition to this, the amount of washing water at reverse washing is small as compared with that at purification operation, that is, current velocity is slow, and small-sized magnetic aggregates accumulated on the filter retain on the filter in high magnetic field for a long period of time. As a result, the respective magnetic aggregates are bonded to form large-sized magnetic aggregates, and the magnetic aggregate groups in washing water can be captured in the rotating type magnetic separation tank 14 with high possibility at reverse washing. Therefore, magnetic aggregates are removed from the reverse washing water, and such a reverse washing water is once stored in the treated water tank 32 through the valve 27 and returned to the impounding reservoir 1, or is used as water for reverse washing through the valve 33 and the conduit tube 34. Further, it is convenient to form a module of a separation reverse washing unit 35 comprising the first magnetic separation section 110, the second magnetic separation section 21, the treated water tank 32, the valves 19, 27 33 and conduit tubes connecting those.

Figure 3:
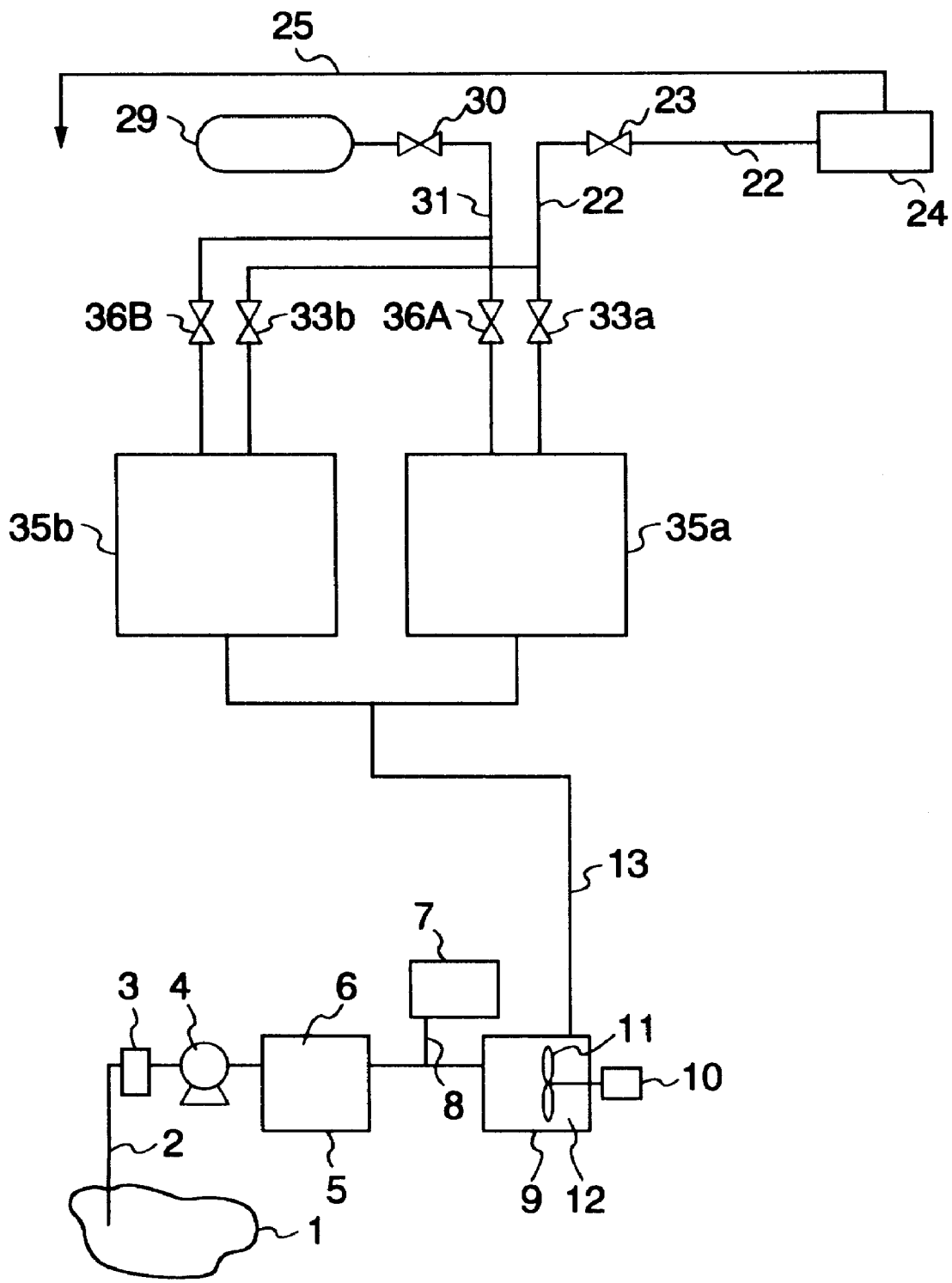
FIG. 3 is a systematic view showing a main configuration of a magnetic separation apparatus according to a third embodiment of the present invention.

The third embodiment according to the present invention is shown in FIG. 3. The points that FIG. 3 differs from FIG. 2 are that a plurality of separation reverse washing units 35, such as two units of 35A and 36B, are disposed in parallel, and in one unit, for example, the separation reverse washing unit 35A, the valve 33A is opened and the valve 36A is closed, during purification operation. At this time, the separation reverse washing unit 35B is during reverse washing operation, wherein the valve 33B is closed and the valve 36B is opened. According to this embodiment, there is the effect that purification operation can continuously be conducted by switching the separation reverse washing units 35A, 35B.

The above embodiments according to the present invention describe the embodiment that permanent magnets are used as magnetic substances, but the same effect as obtained above can also be obtained when the magnetic substances are conductive coils or superconductive coils, which generate magnetic field by supplying electric current, or metal substances which are magnetized by magnetic field of outer magnets such as conductive coils or superconductive coils. Further, the same effect causes even if the outer coil is a magnet which constitutes the high gradient magnetic separator 21. The invention apparatus can be disposed on ships, automobiles, underground and the like.

The raw water used herein means water containing impurities, such as river water, dam water, lake water, sea water, impounding reservoir water, industrial waste water, sewage water, rainwater, and the like. The impurities used herein mean not only suspended solids, algae and fungi described above, but also substances such as organic materials, inorganic materials or micro-organisms, metallic materials, non-metallic materials, soils, radiating materials, metal ions, and the like. In particular, divalent iron ions such as ferrous sulfate and alkalis are added to raw water containing heavy metal ions to coprecipitate the heavy metal ions together with precipitation of ferrous hydroxide, and such precipitates are oxidized with air to form a ferrite. The heavy metals can be magnetically separated by the formation of ferrite. In this case, if it is intended to separate only heavy metal ions, it is not necessary to use a flocculent. Therefore, in this case, raw water may be treated, as pre-treatment, in a stirring tank by introducing ferrous sulfate, an alkali solution and air, and such a pre-treatment water is driven into a magnetic separation section.

According to the first, second and third embodiments of the present invention, the amount of magnetic aggregates accumulated on a high gradient magnetic filter can be reduced in a unit time, resulting in prolonging reverse washing period, and as a result, the average amount of purification treatment per unit time of the magnetic separation apparatus can be increased.

Figure 4:
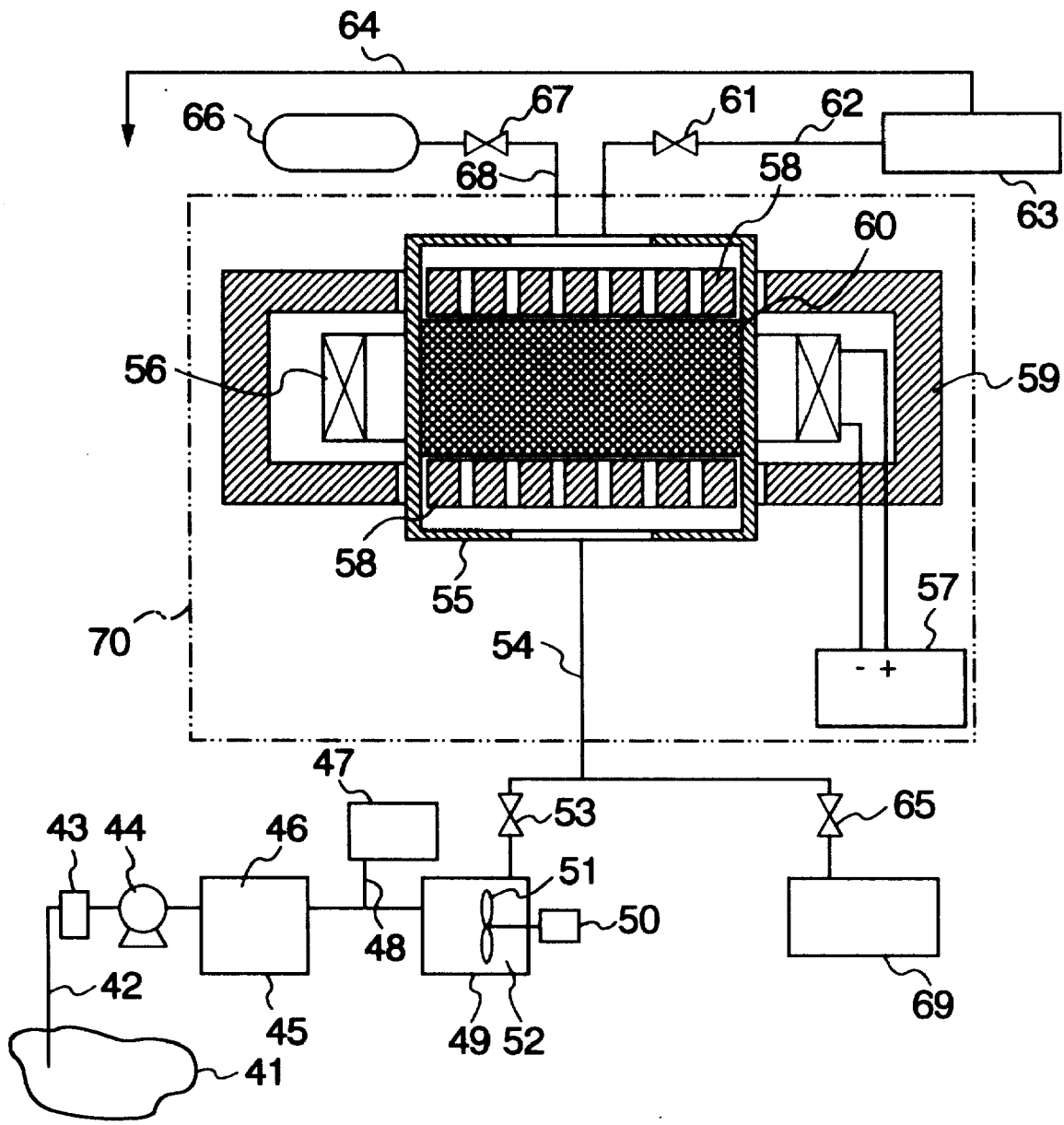
FIG. 4 is a view illustrating a basic flow of operation procedures of a magnetic separation apparatus.

A fourth embodiment of the present invention is illustrated using FIG. 4. FIG. 4 shows a purification apparatus according to the present invention, and a basic flow of operation procedures of the high gradient magnetic filter is shown. Raw water in an impounding reservoir 41 is once stored in raw water storage tank 45 through a filter 43 for removing large dusts via conduit tube 42 by a pump 44. Magnetic powder such as triiron tetraoxide, and a flocculent such as aluminum sulfate or polyaluminum chloride are added from a chemical preparation apparatus 47 to the raw water 46 through a driving pipe 48, as a pre-treatment to a magnetic separation step. The resulting mixture is stirred with a stirrer 51 which rotates by a motor 50 in a stirring tank 49. Suspended solids, algae, fungi and microorganisms in raw water are bonded to magnetic flocks by the flocculent to form many colloidal magnetic flocks having magnetization. Thus, pre-treatment water 52 containing magnetic flocks is produced. The pre-treatment water 52 is flown into a magnetic separation vessel 55 through a conduit tube 54 via a valve 53.

On the other hand, in the magnetic separator 55, direct current is supplied from a direct current electric source apparatus 57 to air-core coil for superconductive coil to generate permanent electric current. In the superconductive coil, magnetic field in proportion to direct current generates in a cylindrical magnetic separator 55. The magnetic field is homogenized by a porous magnetic pole 58 for passing water, and surrounded by iron yoke 59 to prevent leak of magnetic line of force as a passage thereof. Charging magnetic metallic elements of a high gradient magnetic filter 60 are magnetized by the homogenized magnetic field. Coil is disposed in the inside, and a high gradient magnetic filter portion is disposed at the central portion thereof. In the filter vessel, magnetic poles having a number of holes are placed up and down so as to sandwich the high gradient magnetic filter portion. The high gradient magnetic filter is constituted by magnetic metallic elements, and is charged with net-like magnetic stainless metallic elements. By disposing magnetic metallic elements having portions which have a very small curvature radius in such a homogenized magnetic field, local uneven magnetic field is formed at the vicinity of the surface of metallic elements, thereby generating a large magnetic gradient. Further, although not shown, the air-core coil 56 is in a superconductive state in order to reduce consumed electric power. In order to achieve this superconductive sate, the air-core coil 56 is accommodated in a vacuum vessel, and is thermally connected to Giford Macphone type refrigerator generating cold of 4K. This achieves energy savings as a magnet and generates large magnetic force.

The magnetic field in the magnetic separation vessel 55 causes turbulence due to magnetized magnetic metallic elements charged, causing uneven magnetic flux locally, and as a result, many portions becoming high magnetic field gradient occur. If the pre-treatment water 52 containing magnetic flocks is flown from the lower side by an upstream flow, the magnetic flocks contained in raw water are captured on the surface of magnetic metallic elements as fillers by large magnetic force. The purified raw water is once stored as a treated water in a treated water tank 63 through a valve 61 and a conduit tube 62, and is returned to the impounding reservoir 1 through a conduit tube 64.

After the magnetic flocks are captured by a high gradient magnetic filter 60 in a certain amount, reverse washing of the filter is conducted in order to restore the performance of magnetic separation. The reverse washing is conducted as follows. Valve 53 is closed to stop supply of pre-treatment water 12. Direct current source is off. After losing magnetic field, treating water is back flown in a predetermined amount from the upper portion of the high gradient magnetic filter 62 through valve 61, and valve 65 is opened. At this time, air is supplied from air tank 66 through valve 67 and driving pipe 68. While conducting air bubbling, magnetic flocks deposited on the surface of magnetic metallic elements are washed and removed, and washing water is stored in a reverse washing water tank 69.

Valve 65 and valve 67 are closed, and direct current from a direct current source apparatus 57 is again passed through the air-core coil 56 to form a superconductive state, and thereafter, valve 67 is opened to reopen magnetic separation. Purification of raw water is not conducted during reverse washing of the filter. The period of conducting reverse washing varies depending on the concentration of magnetic separation purified materials, the amount of chemicals introduced, and the treatment rate of raw water. The period becomes shorter as the treatment rate of raw water becomes fast.

Figure 5:
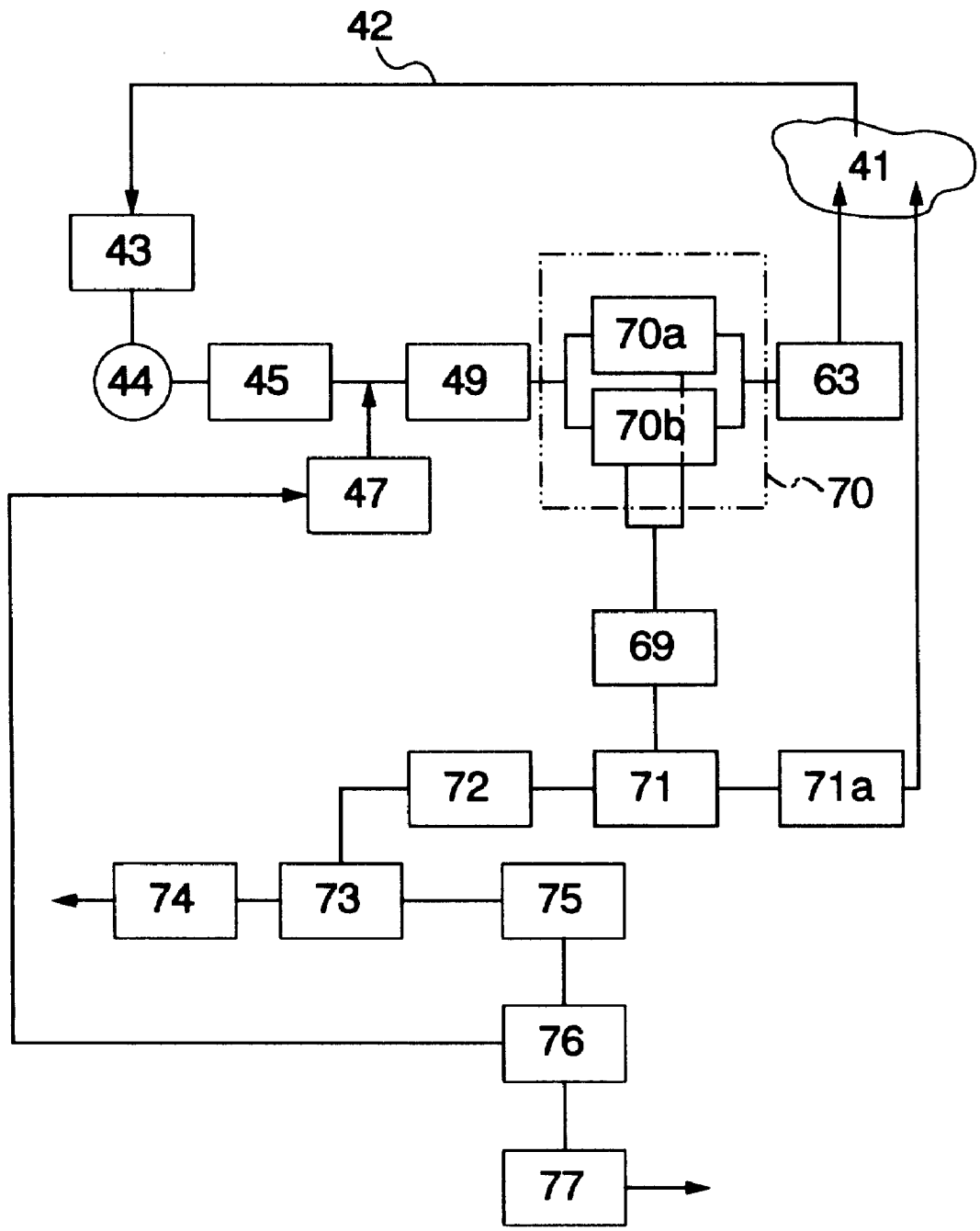
FIG. 5 is a view illustrating a flow of a magnetic separation apparatus of one embodiment of the present invention.

A flow of separating magnetic flocks into water, solid substances such as Mycrocystis, and magnetic powder after conducting magnetic separation by superconductive magnet is explained using FIG. 5. The same reference numbers as in FIG. 4 show the same constitution. The magnetic aggregates captured in the above-mentioned magnetic separator 70 are subjected to reverse washing with a predetermined period, and the washing water containing the magnetic aggregates is stored in the reverse washing water tank 69. The magnetic separator 70 comprises a plurality of magnetic separation portions, such as two magnetic separation portions 70a and 70b. When one of the two magnetic separation portions is back washed, the other thereof conducts purification operation. Thus, in appearance the magnetic separator 30 continuously conducts purification operation.

Microcystis, magnetic powder and water stored in the reverse washing water tank 69 form jelly-like flocks. Microcystis generated in lakes have a density of about 1 as mentioned above. Therefore, even if magnetic powder is separated and the remaining materials are treated with a centrifugal separator, it is impossible to separate Microcystis and water as stated in JP-A-60-244390. Further, condensates after the first magnetic separation described in JP-A-55-61979 are materials from sewage water and waste water, and centrifugation is possible. However, materials to be separated in this embodiment of the present invention are not only Microcystis, but also red tides such as plants or planktons, having a small specific gravity, living in lakes or sea, and it is difficult to separate those materials and water in view of the theory of a centrifugal separator, followed by dewatering. Therefore, in this embodiment, jelly-like flocks themselves, that is, materials in the state that magnetic powder is not removed, are introduced into a centrifugal separator 71. Washing water in the reverse washing water tank 69 is separated into magnetic aggregates having large specific gravity, containing magnetic powder, and washing water in the inside of the centrifugal separator 71. Next, magnetic powder runs out from the magnetic aggregates by centrifugal force applied to the magnetic powder, so that water contained in the magnetic aggregates is separated, and water content in the magnetic aggregates can be greatly reduced. Further, when the magnetic powder runs out from the magnetic aggregates, the magnetic powder is separated from the magnetic aggregates although not completely.

This separated water may be returned to the impounding reservoir 41, or may be used as water for washing in reverse washing. The magnetic aggregate having greatly reduced volume can be stored in a small volume sludge tank 72. If the separated water contains offensive odor components, a deodorizer 71a with a built-in activated carbon-filled vessel or ozone generator is arranged to remove the offensive odor components.

The magnetic aggregates in the sludge tank 72 are further dried and dewatered with burner of a drying furnace 73 having duct collection function using, for example, oils as a fuel, and heating gas is discharged into atmosphere through a deodirizer 74 filled with, for example, activated carbon. Recovery method of magnetic powder from magnetic aggregates is described in JP-A-55-61979. However, magnetic aggregates are burned, resulting in burning and decomposing organic materials such as algae in the aggregates. Therefore, carbides or the like are adhered and bonded to the magnetic powder, decreasing purity of the magnetic powder recovered, and also organic materials cannot effectively be used as compost. After pulverizing into particulates with a crusher 75, magnetic powder having high purity and which does not have carbides or the like adhered thereon can be recovered with magnetic powder separator 76 utilizing a magnetic field of permanent magnet or the like, and be reused as chemicals. Further, the separated materials after removing magnetic powder are treated in a compost treatment tank 77, and are utilized as a fertilizer.

By making the air-core coil which constitutes the magnetic separator 70 into a superconductive coil, coil generating magnetic field becomes large, and the coil can be made small size and light weight. By enlarging the generating magnetic field, adsorbing force of the magnetic aggregates captured on the high gradient magnetic filter 60 increases. Therefore, even if pre-treatment water flows at high rate, it is possible to capture the magnetic aggregates. This results in increasing treatment rate, achieving purification at high rate. Further, consumed electric power can be greatly reduced, and feed equipment can be made small size and light weight. This superconductive coil brings about the same effect even if the coil is cooled with liquid helium or liquid nitrogen refrigerant, or with electron type refrigerator.

Thus, according to this embodiment, the magnetic aggregates in pre-treatment water can be separated at high rate and in a continuous manner. Since the separated magnetic aggregates are dewatered and separated with good efficiency, the magnetic aggregates thus treated can be stored in a sludge tank having a small volume. Thus, structural equipments up to sludge tank can be made small size, light weight, and consumed electric power savings. This results in the effect that the apparatus can be mounted on a mobile vehicles such as ship. Further, since the magnetic aggregates are pulverized without burning, magnetic powder having high purity can be recovered and reused, and also separated materials other than magnetic powder can be used as composts.

In this embodiment, the magnetic aggregates after magnetic separation are introduced into a centrifugal separator in the state that the aggregates contain magnetic powder. However, if materials having a specific gravity of more than 1 and the magnetic aggregates are coagulated with a flocculent before the introduction, and then centrifuged, water can be removed more effectively although steps increase.

Figure 6:
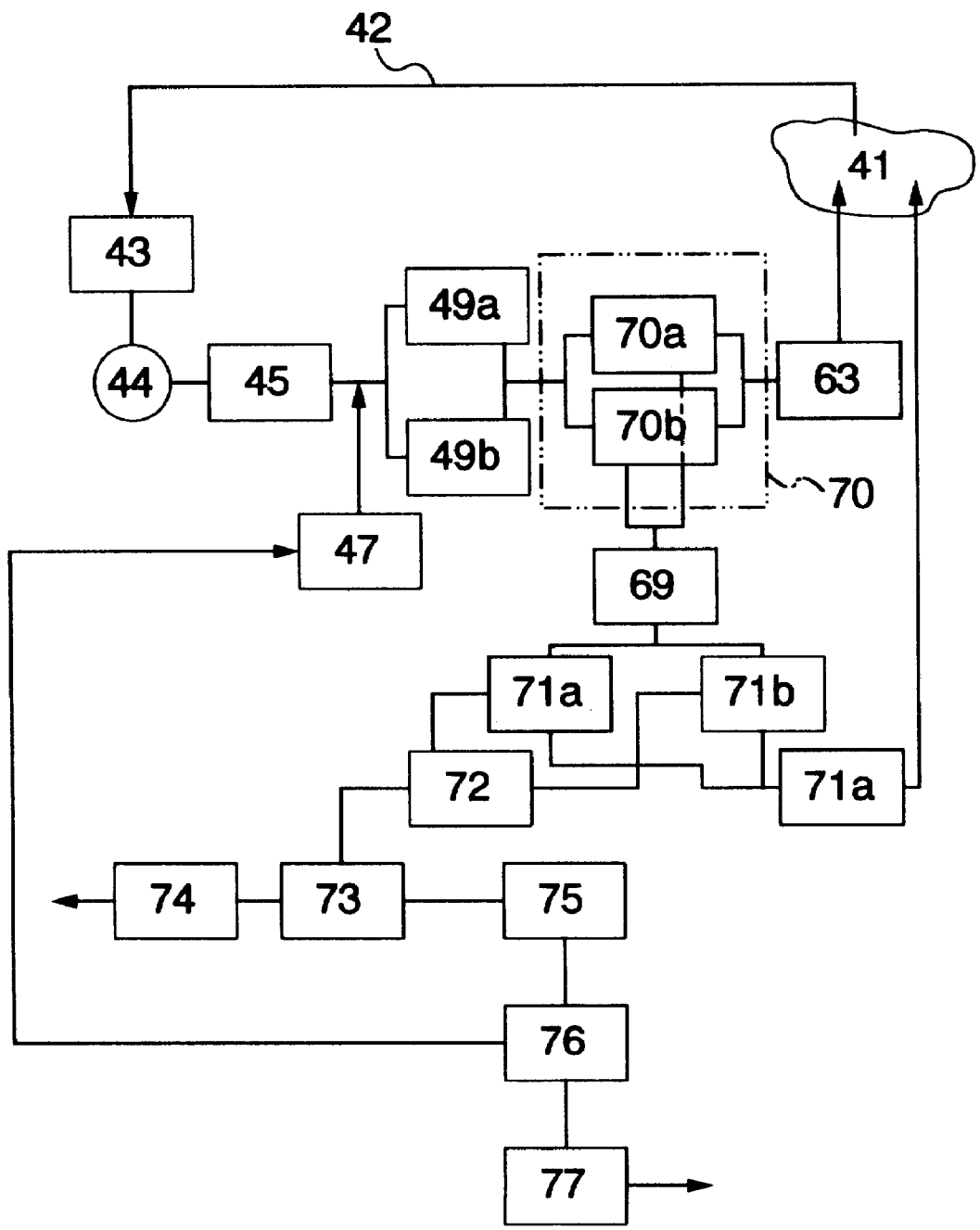
FIG. 6 is a view illustrating a flow of a magnetic separation apparatus of another embodiment of the present invention.

A fifth embodiment which further continuously conducts water purification treatment in the above embodiment is shown in FIG. 6. The points that FIG. 6 differs from FIG. 5 are that a plurality of mixing tanks 9, for example, a first mixing tank 49a and a second mixing tank 49b, are divided and are disposed in parallel, and a plurality of centrifugal separators 71, such as a first centrifugal separator 71a and a second centrifugal separator 71b, are disposed in parallel. This is a structure corresponding to the case that the amount of pre-treatment water changes by the concentration or the like of materials to be removed contained in raw water. If the amount of pre-treatment water is smaller than a predetermined amount, the first mixing tank 49a and the first centrifugal separator 71a operate. This results in that consumed electric power of the respective structural element can be reduced, and operation cost can be reduced. Further, if those are mounted on movable vehicles, such as tracks or ships, particularly ships, considering rotation balance of centrifugal separators, a plurality of centrifugal separators are dividely disposed and are dividely operated such that rotating couples are compensated each other. As a result, the movable vehicles can be maintained more stably, and good purification operation can be maintained.

Figure 7:
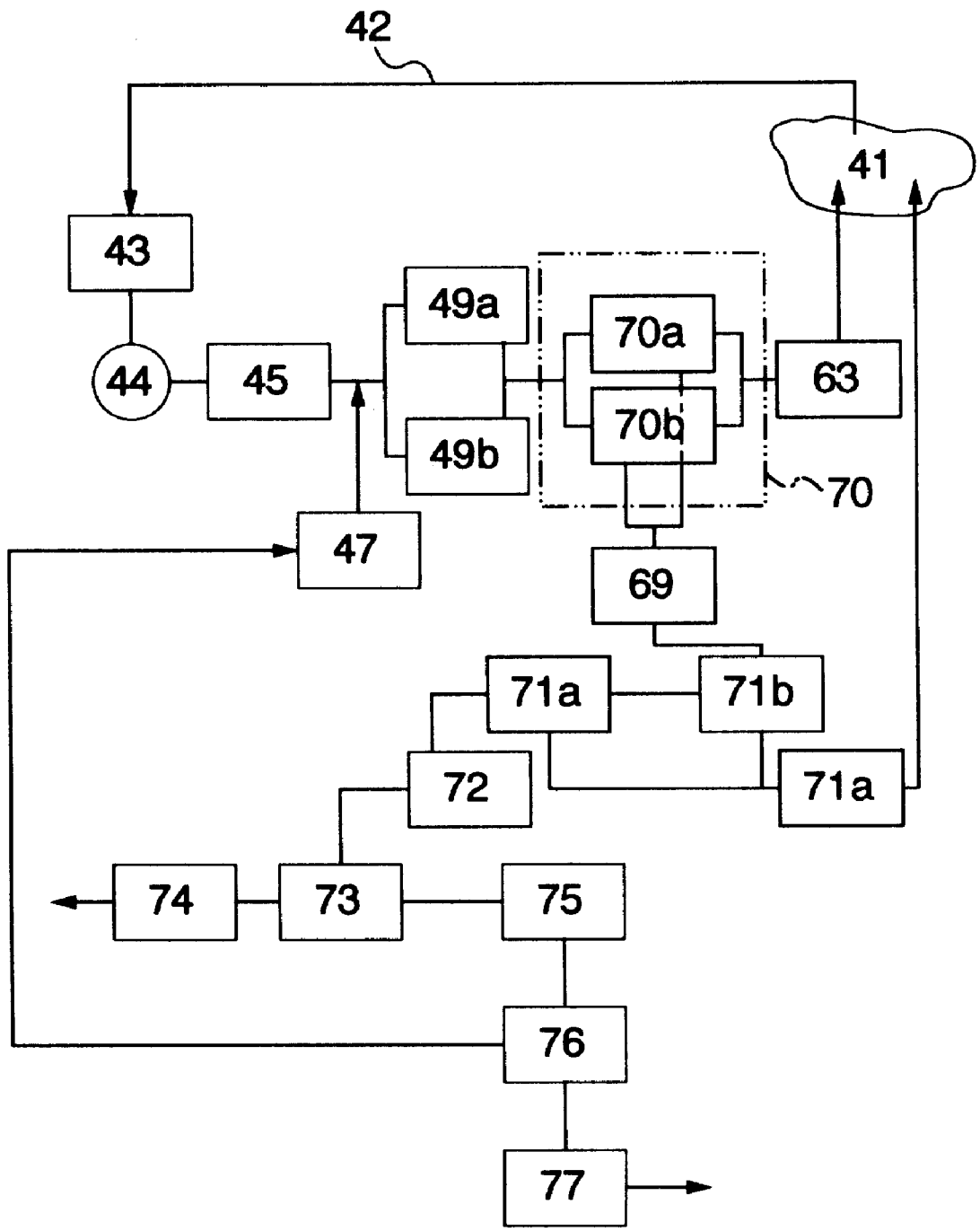
FIG. 7 is a view illustrating a flow of a magnetic separation apparatus of further another embodiment of the present invention.

A sixth embodiment of the present invention is shown in FIG. 7. The points that FIG. 7 differs from FIG. 6 are that a plurality of centrifugal separators 71, for example, a first centrifugal separator 71a and second centrifugal separator 71b, are divided and are disposed in series, wherein the first centrifugal separator 71a is a low speed rotating machine, and the second centrifugal separator 71b is a high speed rotating machine. In the first centrifugal separator 71a having a less consumed electric power, separation of water for washing and magnetic aggregates, which are easy to separate, is conducted with a low rotation, and in the second centrifugal separator 71b, separation of water in the magnetic aggregates, which is difficult to separate, is conducted with a high speed rotation. By taking this structure, the amount of washing water flown into the second centrifugal separator 71b having high speed rotation requiring large consumed electric power is greatly reduced, and dewatering treatment can be conducted with totally small electric power.

Figure 8:
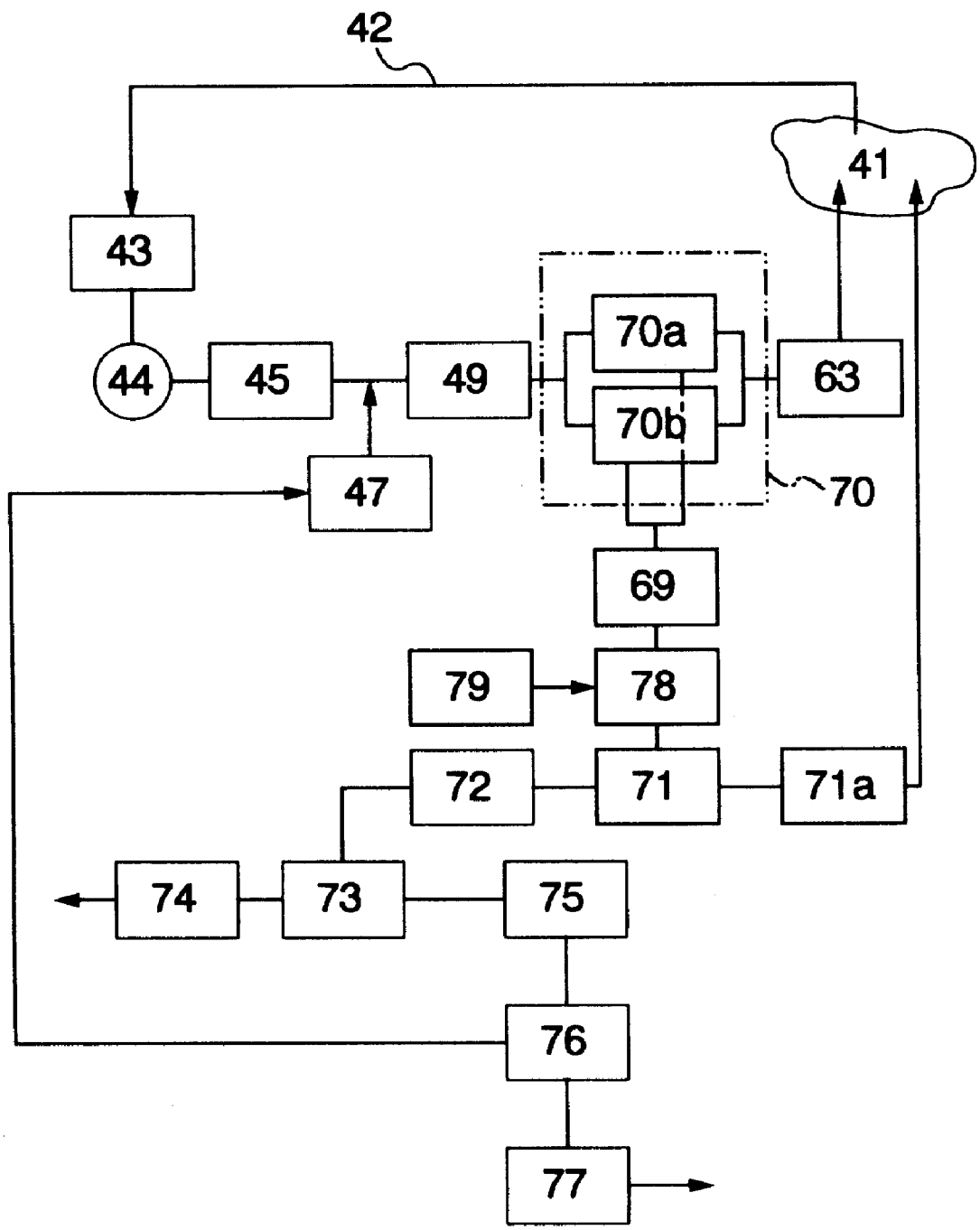
FIG. 8 is a view illustrating a flow of a magnetic separation apparatus of still further another embodiment of the present invention.

A seventh embodiment of the present invention is shown in FIG. 8. The points that this embodiment differs from the embodiment shown in FIG. 5 are that a second mixing tank 78 is disposed at an upstream side of the centrifugal separator 71 and at a downstream side of the reverse washing water tank 69, particles having a specific gravity of more than 1, such as sand fine particles or hydrated lime fine particles, and a flocculent such as polyaluminum chloride are further added to the magnetic aggregates in washing water from a chemical preparation tank 79 and stirred, making it possible to form magnetic aggregates having large specific gravity. By taking this configuration, separation efficiency in the centrifugal separator 71 is greatly improved, centrifugal separator can be made more small size and light weight, and consumed electric power can be reduced.

Figure 9:
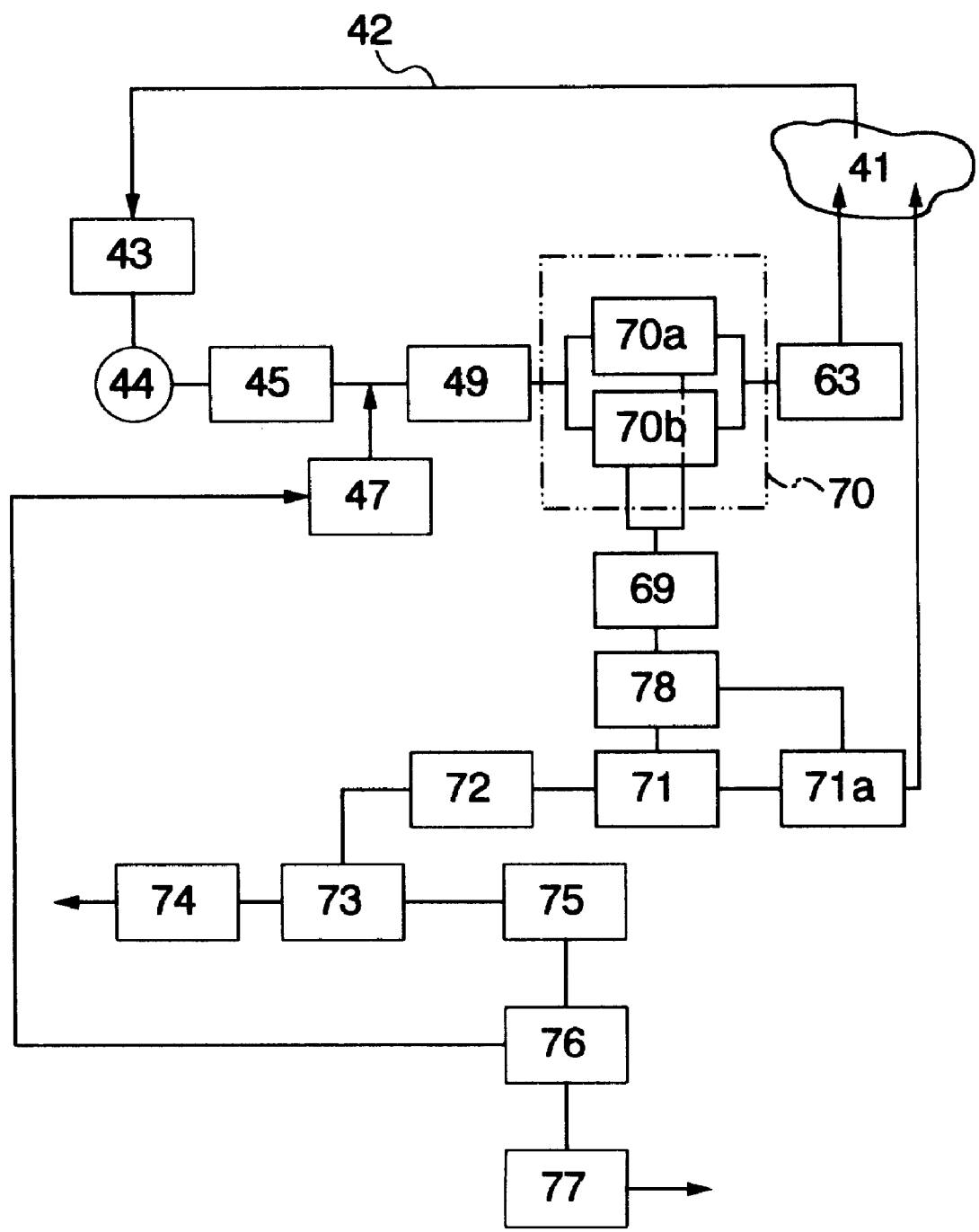
FIG. 9 is a view illustrating a flow of a magnetic separation apparatus of yet still further another embodiment of the present invention.

A eighth embodiment of the present invention is shown in FIG. 9. The points that this embodiment differs from the embodiment shown in FIG. 2 are that a second magnetic separator (not shown) utilizing, for example, permanent magnet having magnetic force smaller than magnetic field of a first magnetic separation is disposed at an upstream side of the centrifugal separator 71 and at a downstream side of the reverse washing water tank 69, magnetic aggregates in washing water and water for washing are separated, and the separated water is returned to the impounding reservoir 1. The separated magnetic aggregates are dewater treated with the centrifugal separator 71. By taking this configuration, the amount of materials flown into centrifugal separator can be reduced. Therefore, treatment load of centrifugal separator becomes small, and the centrifugal separator can be made more small size and light weight, whereby consumed electric power can be reduced.

The same effect as obtained in the above all embodiments can similarly be obtained even if structural equipments of the present invention all are disposed on the ground, even if structural equipments up to sludge tank are disposed on a first movable vehicle and the remaining structural elements are disposed on a second movable vehicle or on the ground, and even if structural equipments up to sludge tank are disposed underground, and the remaining structural elements are disposed on the ground.

According to the fourth to eight embodiments of the present invention, the magnetic aggregates formed in reverse washing of the magnetic separation section can effectively be separated into water and magnetic aggregates.

Figure 10:
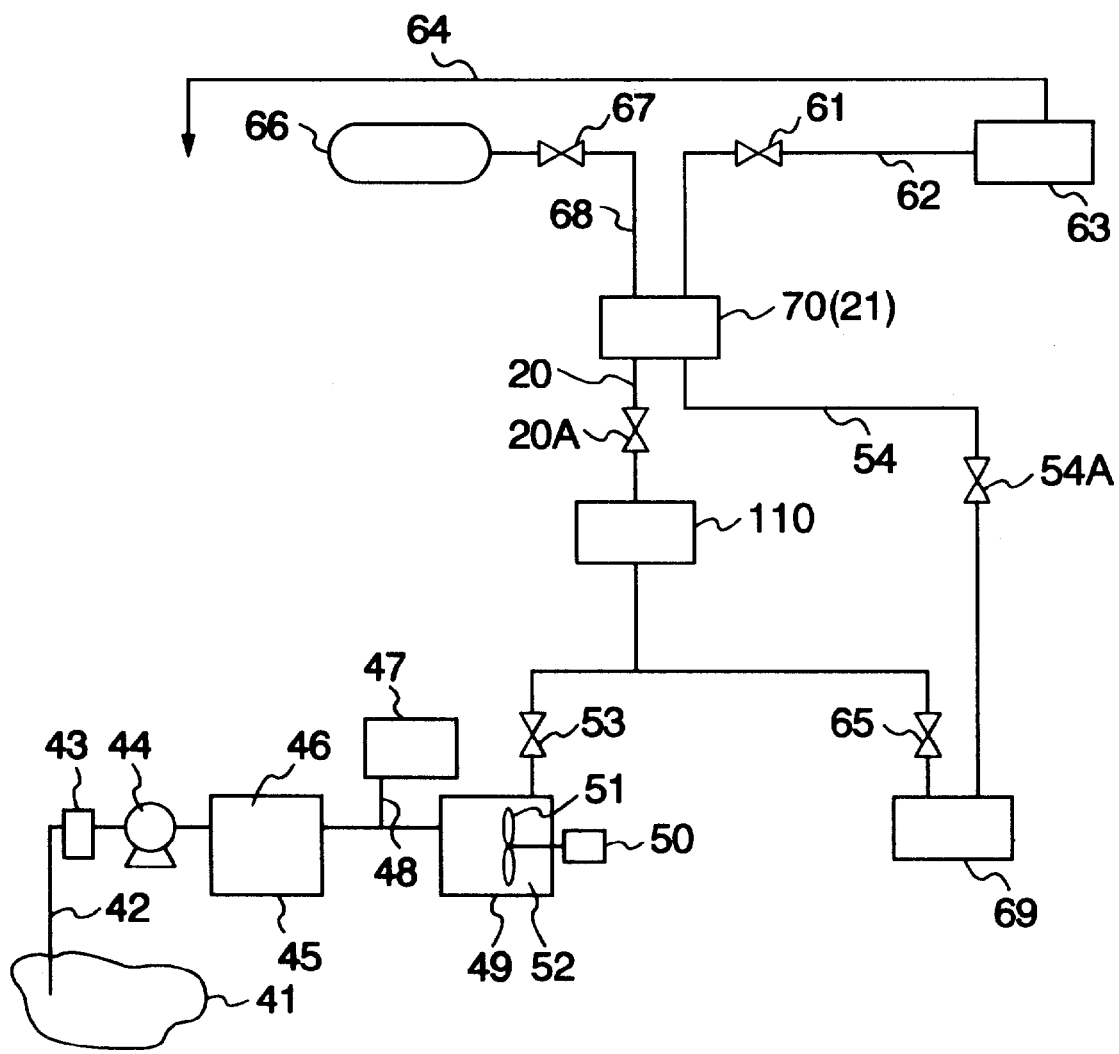
FIG. 10 is a view illustrating a flows of a magnetic separation apparatus of still further another embodiment of the present invention.

A ninth embodiment of the present invention is shown in FIG. 10. This embodiment is a modification embodiment of the second embodiment (FIG. 2), and can also be considered as a modification embodiment of the fourth embodiment (FIG. 4). In the embodiment, the same apparatus as the apparatus in the above-mentioned embodiments refer to the same reference numerals, and the description thereof are omitted. In the embodiment, valve 20A is disposed in a conduit tube 20 which connects the first magnetic separation section 110 and the second magnetic separation section 70 (or 21), and a conduit tube 54 which discharges waste water is connected at the introduction side of the second magnetic separation section 70 (or 21). Other end of the conduit tube 54 is connected to the reverse washing water tank 69, and the conduit tube 54 is provided with valve 54A. By appropriately opening and closing valves 20A, 53, 54A and 65, treated water after reverse washing can be introduced from the first magnetic separation section 70 (or 21) or the first magnetic separation section 110 into the reverse washing water tank 69. Water containing magnetic aggregates in the reverse washing water tank 69 is treated with either of the treatment steps containing the centrifugal separator 71 shown in FIGS. 5 to 9. According to this embodiment, since water to be treated after coarse magnetic aggregates have been removed in the first magnetic separation section 110 is treated in the second magnetic separation section 70 (21), treatment of contaminated water can be conducted with further good efficiency as compared with each step shown in FIGS. 5 to

What is claimed is:

1. A liquid purification apparatus by which contaminants are removed from a contaminated liquid comprising:

a magnetic filter which magnetically adsorbs magnetic aggregates produced by adding magnetic substances and a flocculent to the contaminated liquid;

a concentrator in which the magnetic aggregates separated in the magnetic filter are processed to centrifugally reduce liquid contained in the magnetic aggregates; and means for removing magnetic substances from the magnetic aggregates after centrifugal separation; wherein the means for removing magnetic substances comprises:

a dryer by which the magnetic aggregates are dried to remove liquid;

a pulverizer by which lumps of the dried magnetic aggregates are pulverized into particulates; and a magnetic substance separator by which the magnetic particles are removed from the particulates such that organic materials remain.

2. The liquid purification apparatus according to claim 1, further comprising:

a compost treatment device configured to process the organic materials from the magnetic substance separator to obtain a fertilizer.

3. A water purification system by which contaminants are removed from contaminated liquid for use of those as a fertilizer, comprising:

a magnetic separator by which magnetic aggregates containing contaminants to be removed are magnetically removed from the contaminated water, the magnetic aggregates being produced by adding magnetic substances and a flocculent to the contaminated water;

a concentrator in which the magnetic aggregates separated in the magnetic separator are processed to centrifugally reduce water contained in the magnetic aggregates;

a means for removing the magnetic substances from the magnetic aggregates after centrifugal separation; and a compost treatment device in which contaminants, which are separated from the magnetic substances, from the means for removing the magnetic substances are processed to obtain a fertilizer.

4. The liquid purification apparatus by which contaminants are removed from a contaminated liquid comprising:

a magnetic filter which magnetically adsorbs magnetic aggregates produced by adding magnetic substances and a flocculent to the contaminated liquid;

a concentrator in which the magnetic aggregates separated in the magnetic filter are processed to centrifugally reduce liquid contained in the magnetic aggregates; and a remover for removing magnetic substances from the magnetic aggregates after centrifugal separation, wherein the remover comprises:

a dryer by which the magnetic aggregates are dried to remove the liquid;

a pulverizer by which lumps of the dried magnetic aggregates are pulverized into particulates; and a magnetic substance separator by which the magnetic particles are removed from the particulates such that organic materials remain.

5. A water purification system by which contaminants are removed from contaminated liquid for use of those as a fertilizer, comprising:

a magnetic separator by which magnetic aggregates containing contaminants to be removed are magnetically removed from the contaminated water, the magnetic aggregates being produced by adding magnetic substances and a flocculent to the contaminated water;

a concentrator in which the magnetic aggregates separated in the magnetic separator are processed to centrifugally reduce water contained in the magnetic aggregates;

a remover for removing the magnetic substances from the magnetic aggregates after centrifugal separation; and a compost treatment device in which contaminants, which are separated from the magnetic substances, from the remover are processed to obtain a fertilizer.

* * * * *

UNITED STATES PATENT AND TRADEMARK OFFICE
CERTIFICATE OF CORRECTION

PATENT NO. : 5,944,986
DATED : August 31, 1999
INVENTOR(S) : Norihide Saho et al.

It is certified that error appears in the above-identified patent and that said Letters Patent is hereby corrected as shown below:

Title page,
Please amend the assignee information as follows:

Item [73] Assignees: Hitachi, Ltd.; Hitachi Tsuchiura Engineering Co., Ltd., both of Japan Signed and Sealed this Ninth Day of October, 2001

*Attest:*

*Nicholas P. Godici*

*Attesting Officer*

NICHOLAS P. GODICI
*Acting Director of the United States Patent and Trademark Office*